United States Patent
Laakkonen et al.

(10) Patent No.: US 8,146,950 B2
(45) Date of Patent: Apr. 3, 2012

(54) DIFFRACTIVE COLOR SYSTEM

(75) Inventors: Pasi Laakkonen, Joensuu (FI); Joni Orava, Joensuu (FI); Jeroen Carelse, Hattula (FI)

(73) Assignee: Avantone Oy, Tampere (FI)

( * ) Notice: Subject to any disclaimer, the term of this patent is extended or adjusted under 35 U.S.C. 154(b) by 1493 days.

(21) Appl. No.: 10/577,068

(22) PCT Filed: Oct. 22, 2003

(86) PCT No.: PCT/FI03/00789
§ 371 (c)(1),
(2), (4) Date: Nov. 29, 2006

(87) PCT Pub. No.: WO2005/039172
PCT Pub. Date: Apr. 28, 2005

(65) Prior Publication Data
US 2007/0165309 A1    Jul. 19, 2007

(51) Int. Cl.
*B42D 15/00* (2006.01)
*B42D 15/10* (2006.01)
(52) U.S. Cl. ............... 283/114; 283/67; 283/72; 283/98
(58) Field of Classification Search .................. 281/15.1, 281/51; 283/30, 60.1, 60.2, 67, 72, 96, 97, 283/98, 114, 117
See application file for complete search history.

(56) References Cited

U.S. PATENT DOCUMENTS

| | | | |
|---|---|---|---|
| 3,434,227 A * | 3/1969 | Brown, Jr. ................. | 281/15.1 |
| 4,670,780 A | 6/1987 | McManus et al. | |
| 4,884,130 A | 11/1989 | Huntsman | |
| 5,231,504 A | 7/1993 | Magee | |
| 5,734,800 A | 3/1998 | Herbert et al. | |
| 5,797,632 A | 8/1998 | Rice | |
| 5,956,015 A * | 9/1999 | Hino ............................. | 345/600 |
| 6,084,621 A * | 7/2000 | Shioya ......................... | 283/96 |
| 6,542,634 B1 | 4/2003 | Oga | |
| 6,594,383 B1 | 7/2003 | Speda-Mahmood | |
| 7,355,737 B2 * | 4/2008 | Minowa ....................... | 283/30 |

FOREIGN PATENT DOCUMENTS

| | | |
|---|---|---|
| EP | 0340033 A2 | 11/1989 |
| EP | 550212 A1 * | 7/1993 |
| EP | 0550212 A1 | 7/1993 |
| EP | 0975150 A2 | 1/2000 |
| EP | 975150 A2 * | 1/2000 |

(Continued)

OTHER PUBLICATIONS

Japanese Office Action, dated Jul. 6, 2010, issued in connection with counterpart Japanese Patent Application No. 2005-509576.
Japanese Patent Office Action, dated Aug. 18, 2009, issued in connection with counterpart Japanese Application No. 2005-509576.

*Primary Examiner* — Dana Ross
*Assistant Examiner* — Justin Lewis
(74) *Attorney, Agent, or Firm* — Venable LLP; Eric J. Franklin

(57) ABSTRACT

A method in a diffractive color system that specifies visual color effects and/or target colors that are formed by mixing together two or more diffractively produced primary colors. The primary colors and the characteristics of the elementary gratings used in producing them are selected in such a manner that they produce the desired exact primary colors particularly in the application-specific lighting and by taking into account, when required, the color of the substrate material and/or other background separately. A diffractive color system implements the method. A diffractive component produces the mixed target color. A product contains one or more diffractive color effects.

15 Claims, 8 Drawing Sheets

FOREIGN PATENT DOCUMENTS

| JP | 08-261827 | 10/1996 |
| JP | 09-051548 | 2/1997 |
| JP | 10-187057 | 7/1998 |
| JP | 11-064846 | 3/1999 |
| JP | 2000-050086 | 2/2000 |
| JP | 2002-040218 | 2/2002 |

* cited by examiner ically produced primary colors. In addition, the invention relates to a diffractive color system imple-
DIFFRACTIVE COLOR SYSTEM

CROSS-REFERENCE TO RELATED APPLICATIONS

This application is the national phase under 35 U.S.C. §371 of PCT/FI2003/000789 filed 22 Oct. 2003.

FIELD OF THE INVENTION

The present invention relates to a method in a diffractive color system, which color system specifies visual color effects, target colors, which are formed by mixing together two or more diffractively produced primary colors. In addition, the invention relates to a diffractive color system implementing the method The invention further relates to a diffractive component producing a mixed target color. The invention also relates to a product including one or more diffractive color effects.

In general, the invention relates to applying diffractive elements in producing colors, in which case conventional effects produced by means of printing inks can in certain applications be replaced with diffractively produced colors creating a more effective visual effect.

BACKGROUND OF THE INVENTION

Colors are of great importance in the way of life of the modern human being. Color is an important factor in the production of various materials and a very central factor in the commercial success of many products. For example, the colors used in packing materials have a very significant function in invoking the interest of consumers and in recognizing brands and trademarks. Colors, for example, help a consumer to find brand name products they are already familiar with among other competing products.

When developing color production methods, the aim is thus to provide very brilliant and exact color effects, which must also be reproducible on different materials and in different processes. Brilliant refers herein to, for example, that the color is very pure, exactly of the desired hue, and bright.

In the conventional so-called subtractive color systems colors are formed by mixing colorants or pigments in certain proportions, in which case a surface treated with this kind of colorants reflects the desired color. This type of subtractive and thus light-absorption-based mixing used on printed matter does not, however, in a known manner provide as brilliant and bright colors as the so-called additive mixing, in which light typically representing three primary colors is directly mixed together. Additive color formation is utilized, for example, in cathode ray tubes, in which the primary colors mixed together in a RGB system are red (R), green (G) and blue (B). In the subtractive color systems used with printed matter, the so-called CMYK system is generally used, in which the primary colors are cyan (C), purple (M), yellow (Y) and black (K).

It is known as such that the color spectrum, i.e. the so-called color gamut formed by the primary colors used in subtractive mixing is smaller than the colors achieved with additive mixing.

From prior art are also known such subtractive printing ink systems, in which more than four primary colors are used to provide a wider color spectrum. One such color system based on six primary colors is described in the U.S. Pat. No. 5,734,800.

Also, it is known as such in additive color systems to utilize more than three primary colors in order to achieve a better color fidelity. From prior art are these days known the so-called multi-color primary displays, in which in contrast with a conventional RGB system, for example, six primary colors are used.

In packing materials color formation has, however, conventionally been based almost solely on subtractive mixing of primary colors for the obvious reason that this type of colors can be easily produced in practice by means of printing methods. The tendency for more impressive color effects has, however, lead to that various hologram-based methods have been developed, in which the colors are produced by means of diffractive elements. By means of the hologram effects, the packing materials are provided with the desired brilliancy and they can, in addition, be used to show the originality of the product, for example, because the implementation of holograms is clearly more demanding than normal printing technique, which thus complicates the production of product copies.

U.S. Pat. No. 5,797,632 discloses a solution, in which a color image is produced on the surface of a substrate by printing ink on the surface, to which ink functioning as a medium are further formed three different color halftone images. These halftone images are formed to the printing ink as diffractive elements reflecting three different primary colors, which diffractive elements produce from said three primary colors a color image based on additive color mixing. The printing ink can be heat-setting, photopolymeric or some other thermoplastic ink (see U.S. Pat. No. 5,797,632 column 6 lines 63 to 67).

Even though the above-mentioned patent U.S. Pat. No. 5,797,632 presents a solution that enables the production of holographic effects that are more brilliant than prior art by means of printing technique on, for example the surface of a packing material, the color spectrum implemented by means of it is, however, still too limited to meet the present and ever-growing needs of, for example, product designers.

As a clear deficiency in the solutions according to prior art can also be noticed that thus far no proper tools have existed either, by means of which tools the color hues of standardized color coordinates, such as the CIE 1931 color coordinates (Commission Internationale de l'Eclairage) could be produced in a controlled manner by means of diffractive components by using additive color mixing. This prevents the wide and effective use of diffractively produced color effects, for example, when designing and producing product packages.

SUMMARY OF THE INVENTION

The purpose of the present invention is to provide a new solution, which enables the diffractive production of colors comprising a wider color spectrum than previously. Further, by means of the invention, a color specified by means of any standardized color coordinates, for example the CIE 1931, or a color system specified specifically in relation to such coordinates, for example Pantone®, can be produced accurately by means of diffractive components. One purpose of the invention is to specify a new kind of diffractive color system, by means of which, for example, a graphic designer designing product packings can communicate both with the customer and the parties involved in producing the product packing. Related to this, a central target is also to determine the ways in which information on the colors contained in the color system and on the diffractive components implementing them can be transferred between different parties.

To attain these purposes, the present invention includes a method, a diffractive color system, a diffractive component, and a product, the product includes one or more diffractive color effects.

The basis of the invention is the insight that it is possible to produce very bright and pure primary colors with diffractive gratings by taking into account in the grating design those illumination conditions in which the colors produced by the gratings will be examined. A central feature of the invention is related to the selection of the wavelengths and the number of primary colors in a completely new and inventive manner, which manner enables the implementation of a wider color spectrum than previously in each individual application. In addition, when aiming for an application-specific, accurate color reproduction, attention is now also paid to the spectral characteristics of the grating substrate and the possible other background material. The reproduction of colors produced on different materials is a central feature, which is required in order to reproduce the colors connected to brands in an exactly correct manner and to affect consumers as efficiently as possible.

According to the invention, the desired target color is produced by additively mixing together primary colors, which each are produced with an elementary grating optimized for the primary color in question. The primary colors mixed together, typically three different colors, are selected according to the invention from an application-specific or a color-specific wider primary color candidate group, in which case in different applications and when producing different target colors, it is possible, if required, to use different combinations of primary colors. By selecting from the primary color candidate group the most suitable primary colors application-specifically for producing the color hue in question, it is possible to achieve a significantly wider color spectrum than in conventional color systems, in which the additively mixed primary colors are finalized in advance without a more specific application-specific or target color -specific optimization. In color space, the primary colors are located on the edges of the reproduced color spectrum, i.e. gamut area, and by mixing them it is possible to form mixed target colors, which are located on the area limited by the primary colors in the color space.

According to the invention, the primary colors and the characteristics of the elementary gratings used in producing them are selected in such a manner that they produce the desired exact primary colors particularly in the application-specific illumination and by taking into account, when required, the color of the substrate material and/or other background separately.

In an embodiment of the invention, the primary color candidates are fitted to the spectrum peaks occurring in the spectrum of the light emitted by a fluorescent lamp. For each primary color candidate is designed an appropriate standardized elementary grating comprising e.g. a specific grating profile and period, of which are then selected for use the typically three different primary colors/elementary gratings required for each application situation and/or target color. The additive mixing of the selected primary colors in the desired proportion is achieved by controlling the mutual area ratio of the standardized elementary gratings reproducing them. In other words, in all those situations in which the colors are desired to be reproduced in a fluorescent lamp illumination, according to the invention there are thus, for example, four primary color candidates (which correspond to the four spectral peaks occurring in the fluorescent light) and their corresponding standardized elementary gratings available. These four primary color candidates can cover a specific color area, i.e. color spectrum in the color space, as will become more apparent in the following. In order to reproduce the target color hue at a certain location of the color space, for example three primary colors are selected from the primary color candidates, and by additively mixing them, i.e. by controlling the area ratios of their corresponding elementary gratings, the hue in question is produced.

A basic area unit producing the mixed color and consisting of elementary gratings producing different primary colors, i.e. a virtual color pixel, can create a structure of the elementary gratings formed for example by pixelation in a spotted or banded manner. The pixelation of the basic area unit can be implemented, for example, as a banded horizontal or vertical structure, as will become apparent later. By forming these basic area units side by side, it is possible to produce the desired homogenous color over a larger area, in which case all the basic area units are similar to each other, or, for example, a figure, image, or text formed of mastered halftone images, or some other non-homogenous effect. In the latter case a certain part of the basic area units forms, for example, one of the halftone images, in other words, reproduces a certain hue while the other basic area units reproduce one or more further hues. The final observable effect is formed as a combined effect of these halftone images.

The grating structure assembly formed by adjacent basic area units, in which structure the different basic area units can be arranged to produce the mutually same mixed hue or alternatively, different basic area units can produce different hues, is typically formed, for example, on a printing block or the like manufactured of nickel. By using this kind of a printing block or plate, the grating structure can advantageously by embossing (imprinting) be further transferred onto plastic, paper, cardboard or other suitable material as areas wide enough in order to be able to use said materials, for example, in printed products or as packing material. Preferably the embossing is performed as a roll-to-roll process or by sheet printing.

Thanks to the above-mentioned elementary gratings, which are standardized by their characteristics and intended for a certain illumination condition, it is possible to specify an exact diffractive color system according to the invention, by means of which it is possible to easily implement any color specified by means of standardized, for example CIE 1931 color coordinates, because when the characteristics of standardized elementary gratings and the primary colors produced by them are specifically known, it is possible to specify exact mixing ratios for the selected primary colors in order to produce the desired color. The desired figure can now be reproduced in the desired colors by rastering/pixelating the image to the basic area units, in each of which basic area units the elementary gratings produce the desired mixed color to the basic area unit in question.

With the color production method according to the invention, exact and controlled color mixtures are achieved for a selected viewing angle. This is very important e.g. in producing brands and trademarks. Thus, the invention enables the large-scale production of exact diffractive colors e.g. in graphic and packing industry. The invention also provides means, which can be used to transmit information on the colors of the diffractive color chart exactly and reliably between e.g. the customer, designer and the product manufacturer in such a manner that the colors are reproduced in the desired manner in the finished product.

The invention is not limited solely to applications utilizing fluorescent lamp illumination or other light sources comprising a discrete spectrum, but the primary color candidates (and respective elementary gratings) can also be implemented, for example, for an incandescent lamp with a continuous spectrum and for natural light illumination. However, light sources comprising a discrete spectrum, such as fluorescent tubes, semiconductor emitters (light diodes, semiconductor lasers), or conventional laser illumination (for example gas or crystal lasers) typically provide, however, a significantly better luminance in practice, i.e. brightness, in comparison to light sources with continuous spectra.

A central parameter to be optimized when implementing the color system according to the invention is the luminance of the produced color effect. Luminance, i.e. the perceived surface brightness of a target is dependent on both the spectral power of the radiation reflected by the target and the spectral sensitivity of the eye. The factors affecting the maximization of the luminance are discussed more closely in connection with the following examples.

In the following, the invention will be discussed more in detail by using selected examples, by means of which the invention, its advantages and different embodiments will become more apparent for a man skilled in the art.

BRIEF DESCRIPTION OF THE DRAWINGS

In the following, the invention will be described in more detail with reference to the appended drawings, in which.

DETAILED DESCRIPTION OF THE INVENTION

In the following the invention is described more in detail by using as an example mainly the selection of primary color candidates for fluorescent illumination. In a corresponding manner, the selection of primary colors can also be implemented for other light sources comprising a discrete spectrum, which light source can be formed, for example, by an illuminating apparatus assembled of light diodes having different colors. The optimization of the luminance of the color effect is also described more in detail by means of examples. In addition, the implementation of elementary gratings is described more in detail, as well as how a certain color of the color coordinate system is coded into area ratios of a basic area unit formed of the elementary gratings. Finally, the color system according to the invention is described, as well as advantages attainable by it.

On the Concept of the Color Coordinate System

Figure 1:
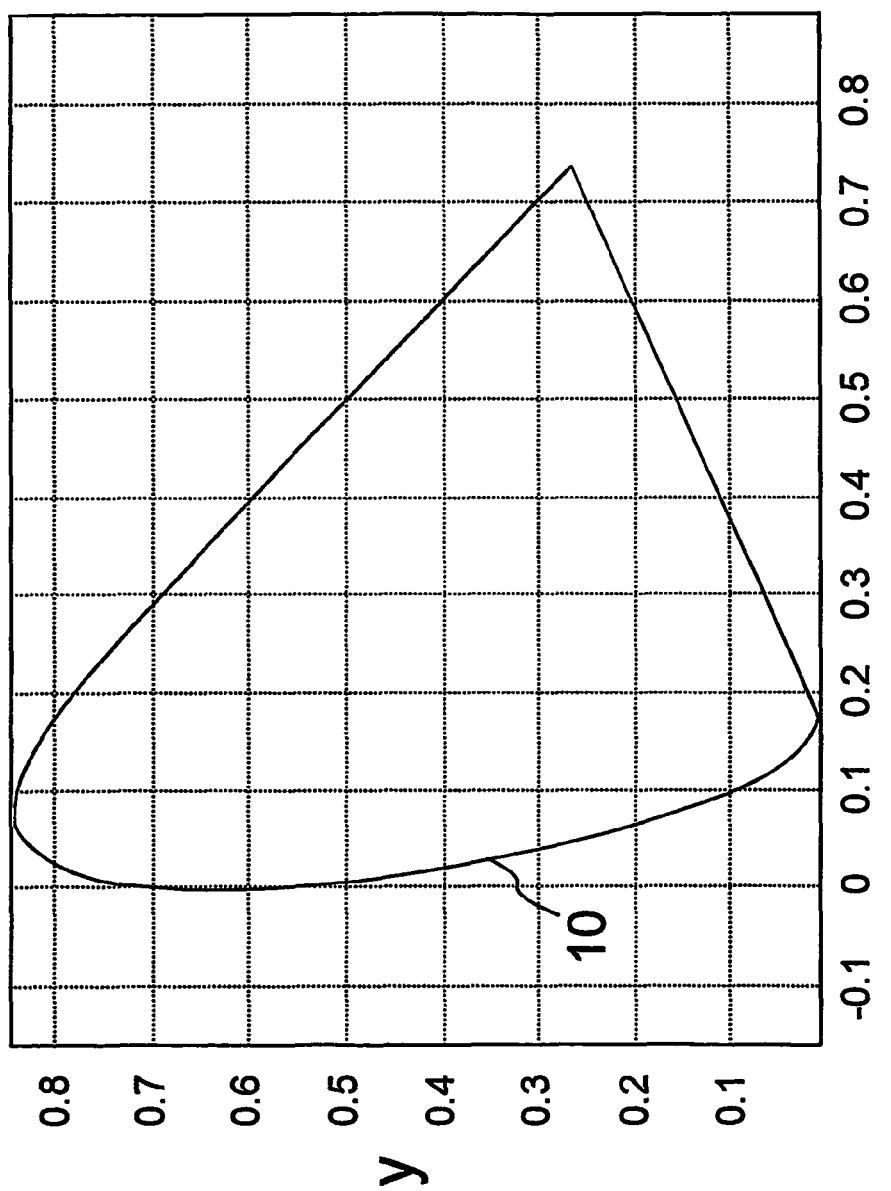
FIG. 1 shows colorimetric CIE color coordinates, in principle.

FIG. 1 shows, in principle, the calorimetric color coordinate system specified by CIE 1931 for an observer having a 2 degree viewing angle. A corresponding color coordinate system is also known for a 10 degree observer. FIG. 1 does not present colors because of technical printing reasons, but the green colors are located in a known way on the upper corner of the graph, the blue colors on the lower left corner and the red colors in the lower right corner. The so-called trisimulus values X, Y, Z according to the radiance spectrum of the target are presented in the color coordinate system, on the basis of which values the so-called chromaticity values x, y are determined in a manner known as such, such that $x=X/(X+Y+Z)$ and $y=Y/(X+Y+Z)$. Only the above-mentioned chromaticity values x and y are usually calculated from the color coordinates, because by means of these two variables it is possible to present the entire chromatic information. Of the trisimulus values, Y represents the color luminance, i.e. brightness. Thus, the three-dimensional XYZ color space can be replaced with the two-dimensional xy space shown in FIG. 1. For example, $x=0.31$ and $y=0.32$ for white color measured in standard light, in which case $z=0.37$ because the condition $x+y+z=1$ holds true for the coordinates. When the different luminance levels are taken into account, the graph 10 of CIE 1931 coordinates includes all the colors that can be detected by a standard observer (of 2 degrees in the examples).

According to the invention, the desired color is produced by additively mixing together typically three primary colors, which each are produced with an elementary grating optimized for the primary color in question. The CIE color coordinates are used later in the description of the invention, but for a man skilled in the art it is obvious that by means of the invention it is possible to implement colors according to any color coordinate system or color system known as such, as long as they can be unambiguously specified in relation to any color coordinate system unambiguously describing the color perception system of humans, for example in relation to said CIE color coordinates.

Selection of Primary Color Candidates for Fluorescent Illumination

Figure 2:
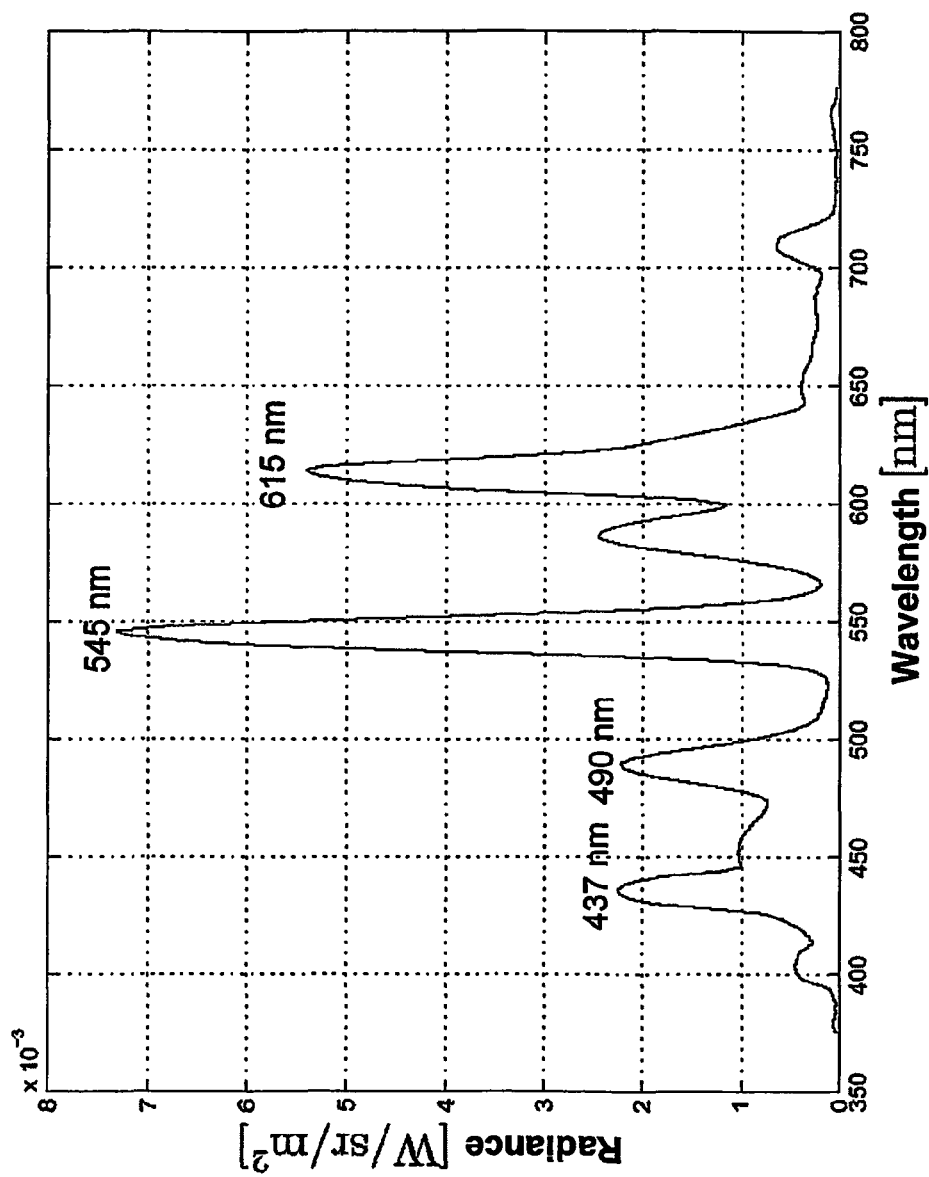
FIG. 2 shows a typical radiance spectrum of a fluorescent lamp.

Fluorescent lamps are electron discharge lamps. In discharge lamps, the electric current is conducted through gas, in which case the gas molecules are excited, and when the excited state is relaxed, they emit radiation. Short-wave radiation emitted by the gas of the fluorescent lamp further excites the fluorescent luminophor on the inner surface of the tube of the fluorescent lamp, which luminophor emits radiation outwards, which radiation is detected as visible light exhibiting a longer wavelength than the exciting radiation. Said excitation and the relaxation of the excited state both in the gas and in the luminophor are resonance phenomena, and therefore the wavelengths emitted in connection with them are dependent on the composition of said substances. In the spectrum of the radiation emitted by the luminophor, clear spectral peaks distinguishable from the continuous background are detected. FIG. 2 shows a typical radiance spectrum of a fluorescent lamp. Because the luminophors used in fluorescent lamps are very similar, these spectrum peaks occur substantially in the same way in the light of almost all fluorescent lamps. If required, however, the invention can also be adapted for such fluorescent lamps, in which the spectrum radiated by the used luminophors deviates significantly from the one shown in FIG. 2 and/or the mutual relationships of the spectral peaks are different and create a different color temperature for the light radiated by the lamp. Thus, the invention is suitable to be used, for example, together with lamps emitting "cold" white light or also with lamps emitting a light of "warmer" color.

According to an advantageous embodiment of the invention, the elementary gratings are optimized to operate in fluorescent illumination, in which case the wavelengths of the strongest spectral peaks occurring in the spectrum of the light emitted by the fluorescent light are selected as the primary color candidates. Typically, these wavelengths are approximately 437 nm, 490 nm, 545 nm and 615 nm.

Thus, the elementary gratings are designed so that in the spectrum of the color produced by the elementary grating, the maximum peak coincides with the spectral peak in the spectrum of the fluorescent lamp, in which case the elementary grating produces a primary color that is as bright as possible (with high luminance) and a primary color which is spectrally pure for a certain viewing angle. With good quality gratings it is possible to produce spectra with very narrow peaks for the desired one or more viewing angles. This means that the primary colors produced with elementary gratings in fluorescent illumination include relatively few different wavelengths, and thus they are very pure colors, in other words very monochromatic. It is obvious for a man skilled in the art that the viewing angle and the width of the detected spectrum is naturally affected also by the angle of incidence of the light impinging on the grating, as well as the width of said angle of incidence, i.e. the degree by which the light beams impinging on the grating deviate from mutually completely parallel beams.

Figure 3:
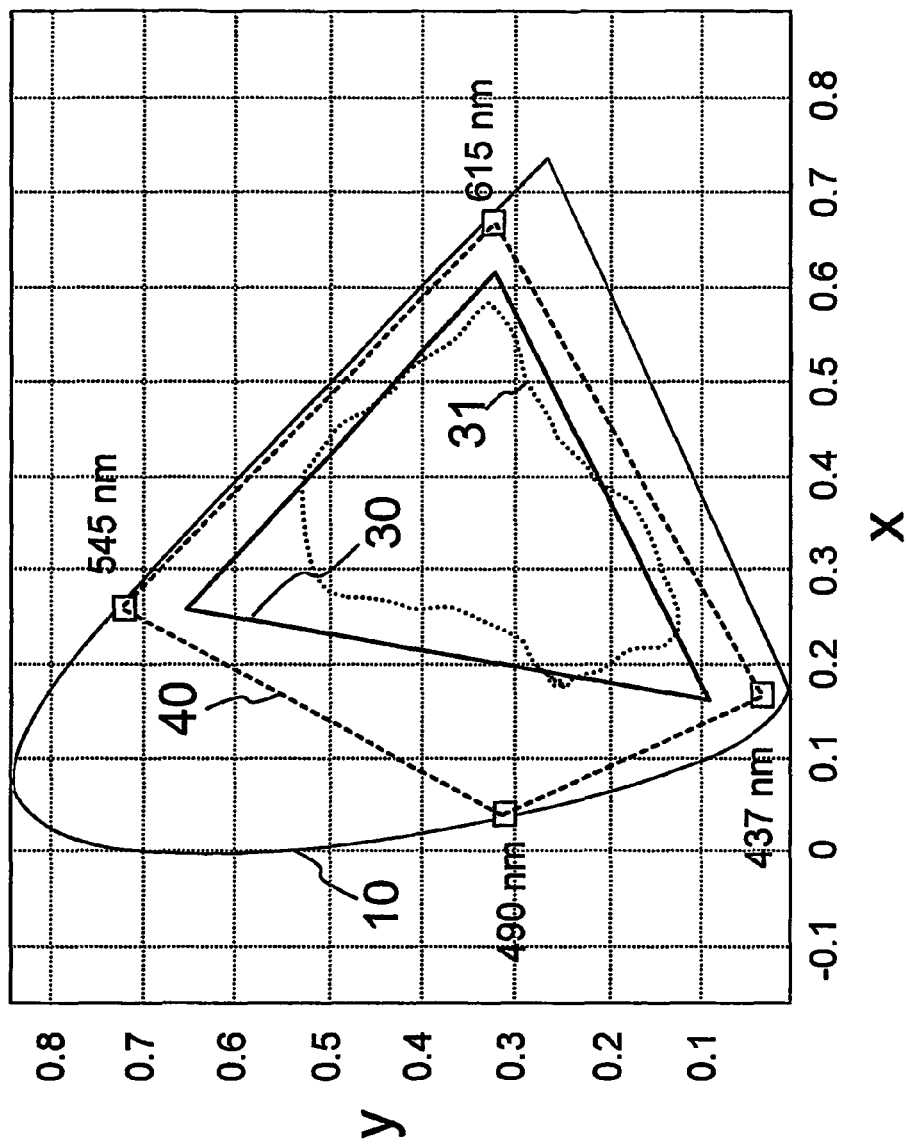
FIG. 3 shows, in principle, the color reproduction areas of a typical monitor and a printer with a wider color reproduction area achieved according to the present invention, FIG. 4 visualizes the color reproduction areas reachable with different primary color selections, FIG. 5 visualizes the implementation of a logo mark and associated text as a pixelated structure consisting of basic area units.

For comparison, FIG. 3 shows color gamuts for a typical monitor (graph 30) and a printer (graph 31) in the CIE 1931 color coordinate system. In addition, the same figure shows a color gamut achieved with the diffractive components according to the present invention (graph 40) when the primary color candidates are selected in the above-mentioned manner to correspond to the strongest spectrum peaks of the emission spectrum of the fluorescent lamp.

An area 40 defined by these above-mentioned four primary colors in the CIE coordinate system includes all those mixed colors that can be produced by means of these primary color candidates.

Figure 4:
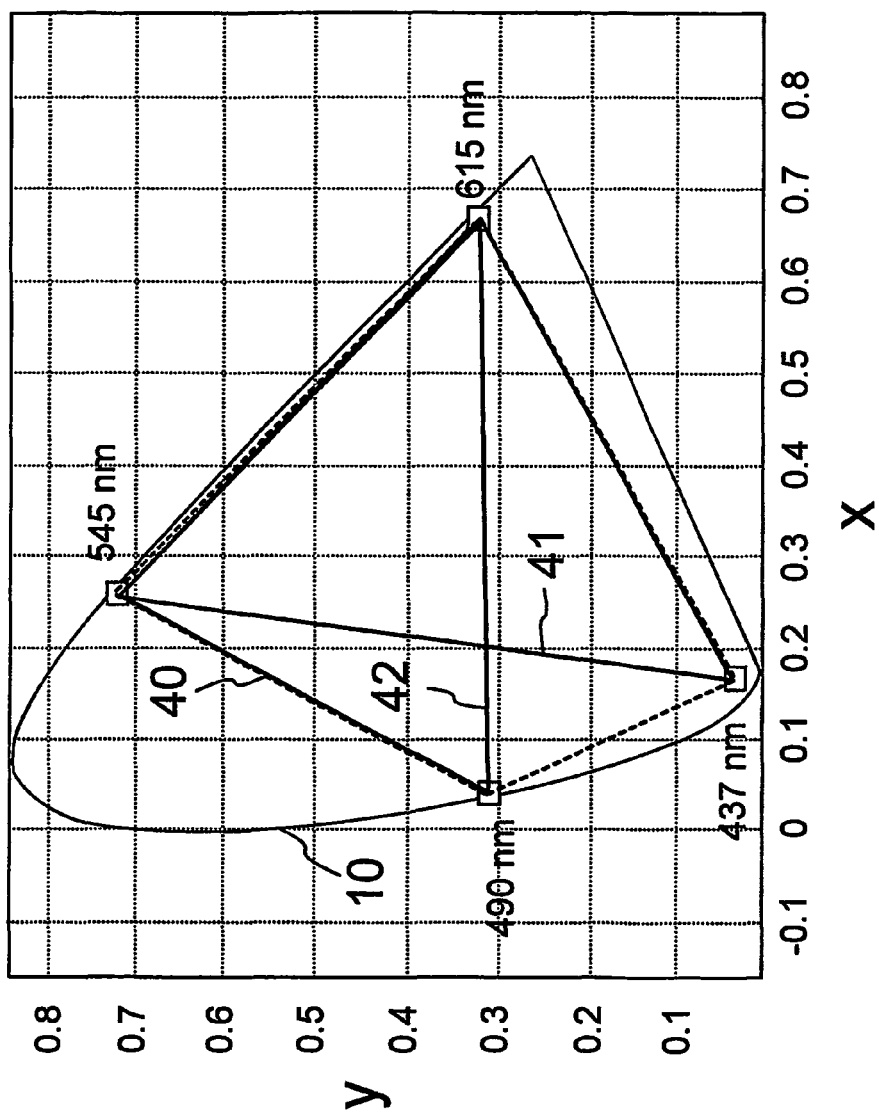

FIG. 4 shows, in principle, how by selecting three of the above-mentioned primary colors into use according to the application, it is possible to produce any target color of the above-mentioned area by mixing them, which area is located within a triangle defined by said three colors in the coordinate system. Graph 41 shows an area in the color coordinate system, which can be covered by using the primary colors 437, 545 and 615 nm. Graph 42 respectively shows a color area, which can be covered by selecting 490, 545 and 615 nm as the primary colors from among the primary color candidates. The target colors can be formed naturally as well by mixing all four primary colors with each other.

The more closely the colors produced by the elementary gratings match the peaks in the spectrum of the fluorescent lamp used as the light source, the more brilliant and bright colors the elementary gratings produce. In practical applications, the width of the angle of incidence of light (parallelism) can naturally be varied, or the width of the angle of incidence can also be quite large, in which case the spectrum produced by the elementary gratings naturally becomes broader in a manner known as such according to the so-called grating equation.

Elementary Gratings and the Basic Area Unit Formed From Them, Pixelation

Figure 5:
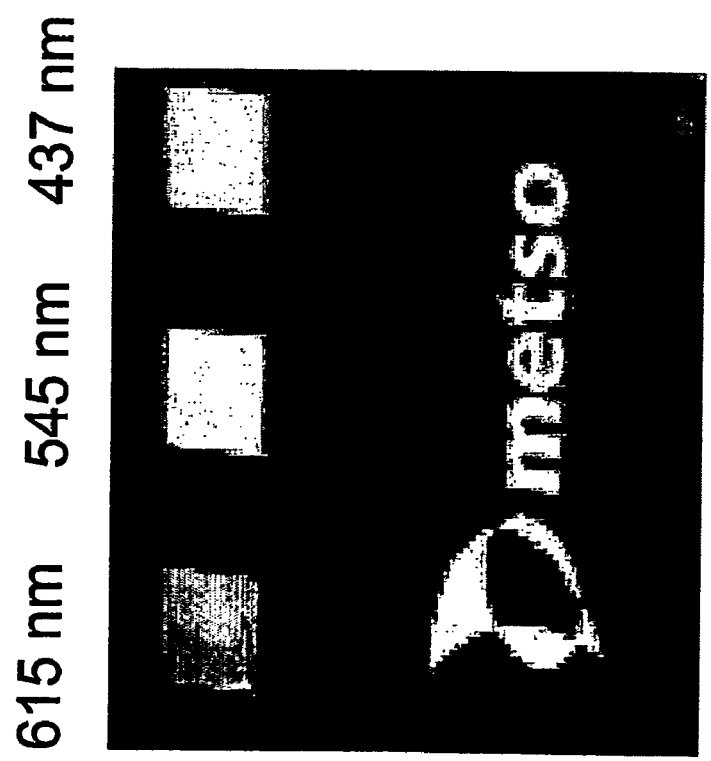

FIG. 5 shows as an example a figure formed by a logo mark and a text connected to it ("metso"), which is composed of a pixelated structure containing basic area units. Because it is not possible to present colored images in a patent application, FIG. 5 has to be presented in gray scale.

There are three square areas on the upper corner of FIG. 5, which each contain only one type of elementary gratings and thus reproduce only one primary color. From left to right, these areas therefore reproduce wavelengths 615 nm (red primary color), 545 nm (green primary color) and 437 nm (blue primary color).

The logo mark and the text, in turn, are composed of virtual color pixels, i.e. basic area units, which each basic area unit contains each of the three above-mentioned elementary gratings in a suitable mutual ratio of areas. Thus, the logo mark is arranged to be reproduced in a certain viewing angle for the viewer as a mixed orange hue and the text correspondingly as a green hue in the manner that these hues have been specified for the company mark in question.

In an individual basic area unit, the elementary gratings are implemented in such a manner that each of them reflects its characteristic primary color substantially to the same viewing angle, in which case the human eye sees the light transmitted by the adjacent arranged elementary gratings as a color mixed from the primary colors, and within the basic area unit it is not possible to detect an individual elementary grating/primary color as an individual color. The elementary grating areas corresponding to individual primary colors are so small that the human eye cannot detect them as individual objects.

Figure 6:
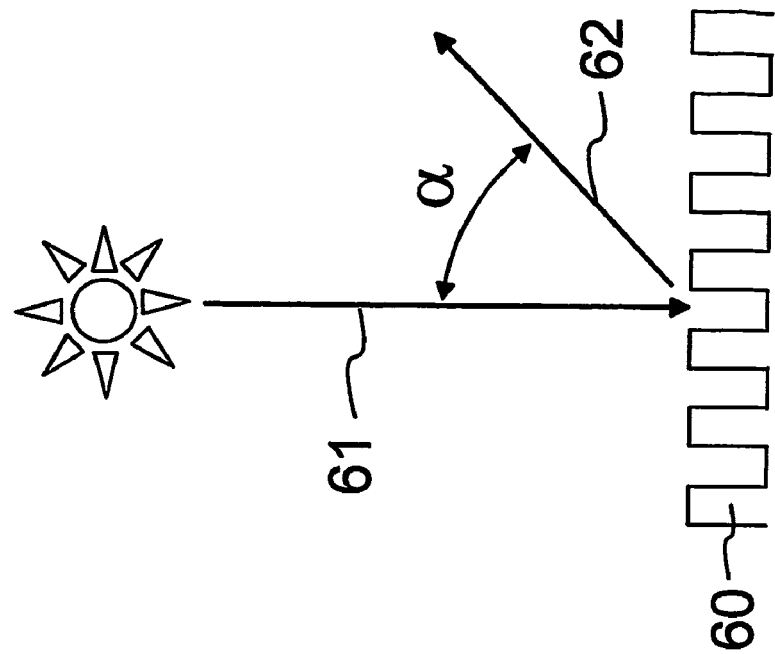
FIG. 6 shows, in principle, a periodic and binary diffraction grating structure, which can be used to implement elementary gratings.

FIG. 6 shows, in principle, a periodic and binary diffraction grating 60, which can be used as an elementary grating. The grating 60 divides light 61 impinging on it in a manner known as such according to the so-called grating equation, into parts reflected to different directions. In the case of the elementary grating, the desired primary color is reflected to a desired angle $\alpha$, i.e. to the viewing or detecting direction 62 (viewing angle), by selecting the parameters governing the optical operation of the grating 60, e.g. the grating profile, the grating period, the height of the grating profile, the filling factor of grating, and the diffraction order used appropriately. The characteristics of grating can also be implemented in such a manner that there can be more than one viewing direction.

One advantageous value of the viewing angle $\alpha$ can be, for example 30°. Thus, it is possible to use, for example, the following grating periods determined by the grating equation for the elementary gratings, when it is assumed that light impinges on the grating substantially in the direction of the normal of the grating surface, as is shown in principle in FIG. 6: for red (spectral peak 615 nm) 1.23 μm, for green (spectral peak 550 nm) 1.1 μm, for cyan (spectral peak 490 nm) 0.98 μm and for blue (spectral peak 437 nm) 0.875 μm. Thus, the ratio of the grating period to the wavelength assumes the value of 2.

If the grating is printed on the front surface of the substrate, one suitable height of the grating profile is between 130 to 150 nm. The height of the grating profile is, because of the manufacturing technique, advantageous to select equal for all elementary gratings, even though the height of the grating profile is then always a compromise, because, for example, for the above-mentioned blue primary color the most advantageous height of the grating profile is approximately 125 nm, while for the green color it would advantageously be 155 nm. The above-mentioned values for the height of the grating profiles are values determined by calculation and the invention is thus not limited solely to the use of them, but the height of the grating profile together with the other grating parameters can be optimized according to the situation.

Another advantageous value of the viewing angle $\alpha$ can be, for example, 54°. Thus, for the elementary gratings it is possible to use the following grating periods specified by the grating equation, when it is assumed in this example as well that the illumination takes place in the direction of the normal of the surface: for red (spectrum peak 615 nm) 760 nm, for green (spectrum peak 550 nm) 680 nm, for cyan (spectrum peak 490 nm) 600 nm, and for blue (spectrum peak 437 nm) 540 nm. Thus the ratio of the grating period to the wavelength has the value of approximately 1.24.

Figure 8:
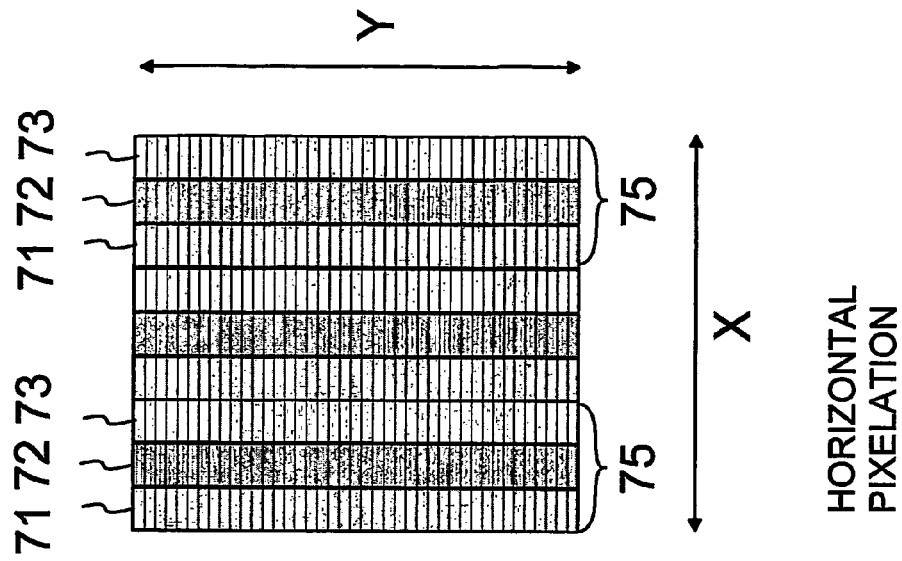
FIG. 8 shows, in principle, a basic area unit structure pixelated horizontally in a banded manner.
Figure 7:
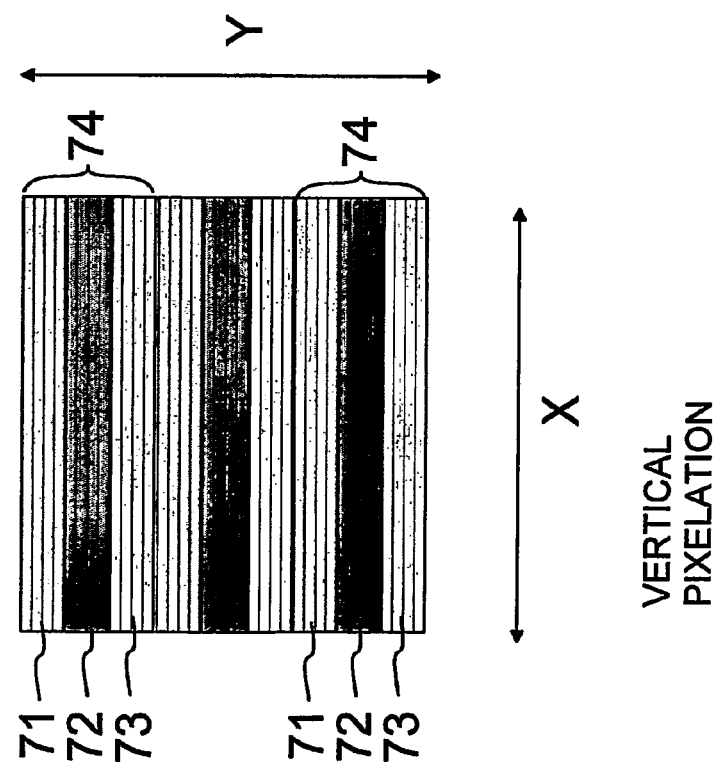
FIG. 7 shows, in principle, a basic area unit structure pixelated vertically in a banded manner.

FIGS. 7 and 8 show some examples of how the mixed color-producing basic area unit 74, 75 formed of different primary color-producing elementary gratings 71 to 73 can be implemented in various ways. The elementary gratings 71 to 73 shown in FIGS. 7 and 8, which reproduce different primary colors, may be, for example, binary gratings according to FIG. 6, in which the above-mentioned grating parameters are in each grating selected in such a manner that the primary gratings reproduce different primary colors to the same viewing angle α, for example the wavelengths 615 nm (red primary color, grating 71), 545 nm (green primary color, grating 72) and 437 nm (blue primary color, grating 73).

FIG. 7 shows, in principle, an in the so-called banded manner vertically pixelated basic area unit 74 and FIG. 8, correspondingly an in a banded manner horizontally pixelated basic area unit 75. In the vertically pixelated basic area units 74 in FIG. 7, the length of the grating lines (direction x) can be freely selected, while the number of sequential grating periods (direction y) is limited. In the horizontally pixelated basic area units 75 in FIG. 8 the situation is the opposite, i.e. the number of sequential grating periods can be increased (direction y), but the length of the grating lines (direction x) is now limited in practice. When using banded pixelation, there is thus the possibility to select one direction (in FIG. 7 direction x, in FIG. 8 direction y) in which the dimension of an individual basic area unit can be increased to cover, for example, in a printed product the entire width of the printed product to be covered with the color effect. In other words, the dimension of an individual basic area unit in at least one direction along the plane of the substrate is selected to be substantially greater than in the other directions along the plane of the substrate, its maximum in said one direction being limited only to the dimension of the substrate.

In the case of the vertical banded pixelation, the "height" of the basic area unit 74 in the direction y is advantageously 50 to 100 μm. In the case of the horizontal banded pixelation the "width" of the basic area unit 75 in the direction x is advantageously 30 to 100 μm.

The applicant has noticed that, in principle, by using the horizontal banded pixelation according to FIG. 8, it is possible to achieve, in practice, a more exact mixing of primary colors and thus produce a more precise color effect than with vertical pixelation according to FIG. 7. Also, in vertical pixelation disruptive diffraction may occur, which is caused by that the sequential basic area units 74 in the direction y in themselves form a periodically repetitive structure causing diffraction, whose grating constant is significantly greater than the grating constant of an individual elementary grating.

The invention is not solely limited to the use of the above-described ways of banded pixelation, but the elementary gratings can be arranged in an individual basic area unit, for example, as adjacent substantially square areas, in which case an individual basic area unit can be formed as, for example, an array-like 2×2 structure. In this kind of a 2×2 array it is possible to use, for example, four mutually different elementary gratings/primary colors, or also three different elementary gratings/primary colors, in which case one selected primary color is represented in the array by two elementary gratings, which can be arranged next to each other, on top of each other or crosswise in the array.

As a difference to the above-described pixilation, it can be noticed that when using array-like pixelation, the dimensions of the basic area unit both in the x and y directions (cf. FIGS. 7 and 8) are limited. Thus, the array-like pixelation is best suited, for example, for reproducing rastered figures and the like, while by means of banded pixelation it is possible to reproduce uniform color effects that are wider in their area. In other words, when using the array-like pixelation, the dimensions of an individual basic area unit in all the directions according to the plane of the substrate can be selected to be equal and small in relation to the dimensions of the substrate. In addition to the 2×2 type arrays, for example, the 1×3 and 3×1 type arrays limited both in the x and y directions are also possible. The number of pixels in an individual array can also be greater than in these.

On the Structure of Elementary Gratings

Elementary gratings are diffractive structures, the dimensions of details of whose relief of surface (grating profile) are very small, even in the sub-micrometer regime. For manufacturing this kind of diffractive elements, special devices and methods are applied, including lithographic methods, such as laser beam writing and electron beam writing described in more detail in the following.

FIGS. 9a to 9f show, in principle, process steps, in which a desired relief can be formed on a printing block required for embossing by performing the embossing of a resist layer, by using an electron beam in this case. It is to be noticed that the invention is not limited solely to the use of electron beam embossing, but it is possible to use also other adequately exact methods in embossing, for example a laser beam or other lithographic methods.

Figure 9A:
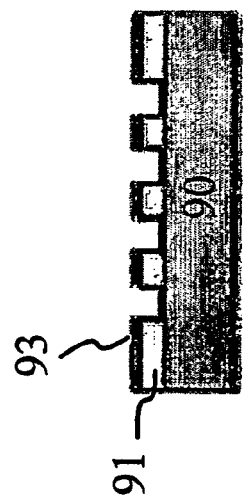
FIGS. 9a to f show a way of producing a printing block used in embossing.
Figure 9D:
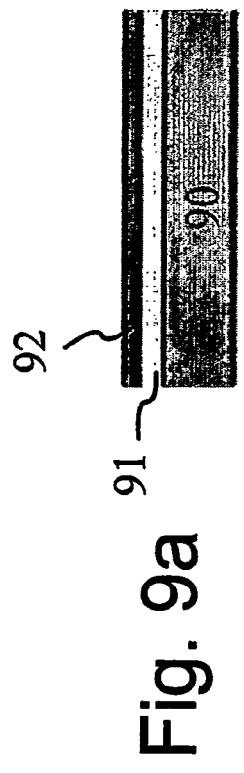
Figure 9B:
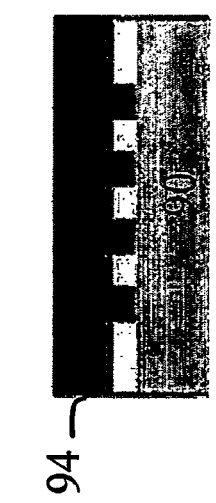
Figure 9E:
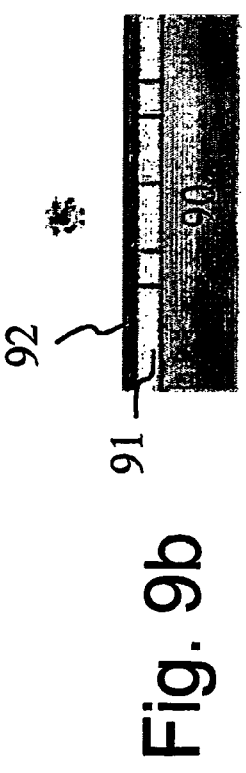
Figure 9C:
Figure 9F:

FIG. 9a shows, in principle, the coating of a substrate material 90 (glass, quartz, silicon, etc.) with a resist layer 91 and a conductive layer 92 required for electron beam embossing. The purpose of said conductive layer 92 is to transfer away electric charge produced by an electron beam used in the embossing. FIG. 9c shows the development of the resist layer 91, as a consequence of which a part of the resist layer can be selectively removed, in which case the so-called master element remains. In FIG. 9d, a conductivity layer 93 is evaporated onto this master element, on top of which is further grown a nickel printing block 94 in FIG. 9e. In FIG. 9f, the nickel printing block is presented as removed from the master element of FIG. 9c.

In addition to the above, there are several other alternative lithography methods known as such and their different combinations for figure formation on the nickel printing block. The nickel printing block 94 of FIG. 9f can be used for embossing as such, or additional printing blocks can be grown from it by repeating the process step according to FIG. 9e.

With the above-mentioned lithographic methods it is possible to produce figure areas, whose areas are with modern production techniques <8"×8". Larger areas are, in practice, produced with a recombining method, in which an individual printing block 94 produced with the above-presented methods is copied with hot embossing or molding methods on a larger substrate by copying the structure onto the surface of the substrate in xy directions defined by its plane. In hot emboss copying, the nickel printing block 94 produced above is set onto a metal supporting plate of the size of the printing block in question, and with it, the figure is printed on an appropriate plastic material, for example PMMA material (polymethyl-methacrylate), with the hot embossing process. By repeating the process several times and at different locations of the plastic material, a new master element comprising a larger area can thus be produced, using which a printing block or plate comprising a larger area is electrolytically grown.

The combining is also possible to be done by spreading liquid polymer material onto a plastic, glass or quartz substrate comprising a larger area, to which material the figure of the nickel printing block 94 is printed. By hardening the polymer locally (for example by heating, with UV light or by using an adequate hardening time), the structure of the figure can be produced into said location on top of the substrate. By repeating the process at several different points, a master element comprising a larger area can again be formed, and a printing plate may further be grown from it, which plate is suitable to be used around a roller or the like.

By using this type of a printing block or plate, the grating figure can be transferred preferably in a roll-to-roll process by embossing, for example, onto paper, cardboard or plastic, which are further suitable to be used in printed products or as packing material. Other substrate materials suitable for this purpose are, for example, glass, textile, metal and ceramic materials. Advantageously, the basic material of the product functions as the substrate of diffractive components at the same time. Coatings produced on different substrates can also function as a substrate, such as, for example, layers of lacquer, paint or printing ink. Mass production can, instead of by means of a roll-to-roll process be implemented also by means of sheet printing, which is well suited for, for example, cardboard materials and other relatively stiff substrates. Embossing can take place, for example, as hot embossing or also without raising the temperature of the substrate and/or the printing block, depending on the characteristics of the substrate material and the grating relief to be transferred.

Advantageously, the basic material of a product according to the invention, for example packing material, functions at the same time as the substrate of the diffractive components according to the invention.

It is obvious that even though the elementary gratings according to the invention are implemented preferably as surface gratings, which enables their effective copying to take place by printing in view of mass production, the invention is not limited solely to the use of surface gratings. In principle, the invention can also be applied for different kind of grating structures formed inside the substrate or on the interface between two materials, such as the so-called buried grating structures.

Also, the selection of grating profiles is not limited solely to the use of periodic binary, i.e. substantially rectangular grating profiles. The invention can also be implemented, for example, by using different sine or triangular shaped grating profiles. Depending on the substrate material, the selection of the grating profile can also be affected by that the implementation of grating profiles comprising, for example, perpendicular walls for the material in question is not, in practice, possible, but in order to succeed, the embossing requires a grating profile, which reduces the risk of sticking of the substrate to the printing block, and reduces the friction between them. Further, it is possible that the grating profile is a so-called multilevel profile, in which the height of the grating profile varies in different parts of the grating within one or more grating periods.

Coding of a Mixed Color by Using Known Color Coordinates

By means of the invention, it is possible to exactly implement colors that have been specified by means of some known color coordinate system. In the following, the manner how a hue specified by means of the CIE coordinates is formed by means of the invention is discussed shortly as an example.

In the first step, for example, three such primary colors that form a triangle in the xy level of the color coordinates within which the desired mixed color remains, are selected from among the primary color candidates, as is shown in FIG. 4.

The proportional ratios p1, p2 and p3 of primary colors in a mixed color are determined now by means of a linear conversion. The XYZ values of the target mixed color are multiplied by a 3×3 array and further multiplied with a scaling factor, with which scaling factor the luminance produced by the grating is determined. Said 3×3 array is formed as an inverse array of the array product of the color fitting functions (three) determined by CIE and known as such, and the selected primary color spectra (three). Thus, both the spectral sensitivity of the human eye and the spectrum of the elementary gratings producing primary colors are taken into account in the calculation, when the mutual relationships of the primary colors are determined by means of the calculation.

The end result of calculation in this case is the mutual relationships p1, p2 and p3 of the three primary colors. These ratios further determine the mutual area ratios of the elementary gratings reproducing the primary colors in question in the individual basic area unit formed by the elementary gratings.

Figure 10:
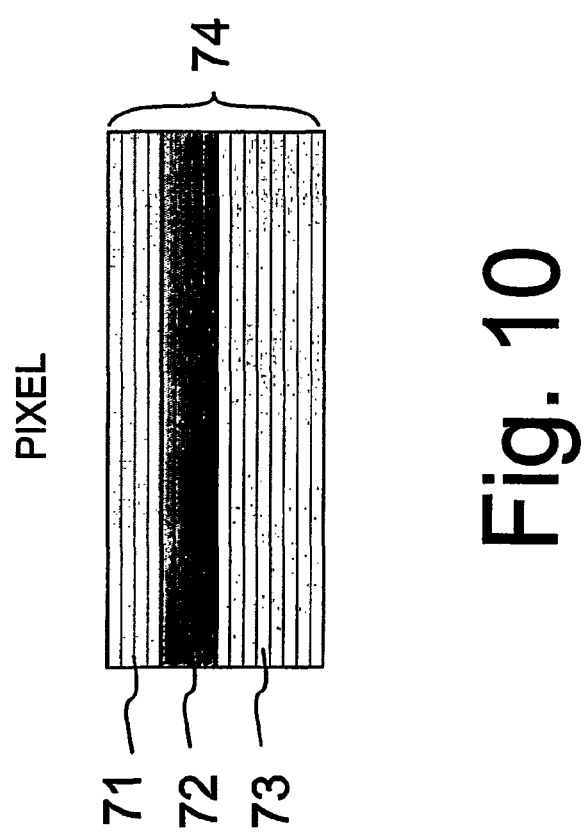
FIG. 10 shows an example of one mutual relationship of elementary gratings/primary colors in a basic area unit.

FIG. 10 shows, as an example, a situation in which the portion of both elementary gratings 71 and 72 of the basic area unit is 25% and the portion of the elementary grating 73 is 50%. The primary colors corresponding to these elementary gratings are reproduced in the mixed color reproduced by said basic area unit in the same ratios. Preferably, in the case of the vertical pixelation presented in FIG. 10, the total height of the basic area unit 74 is advantageously from 50 to 100 µm, as is described in connection with FIG. 7.

Special Procedures, Which Affect the Detectability of a Mixed Color

When aiming for an application-specific, exact color reproduction according to the invention, attention is also paid to the spectral characteristics of the grating substrate and the other possible background material. Because the color of a colored substrate or a colored background visible through a transparent substrate is diffractively added to the diffractively produced mixed color, this phenomenon can be taken into account when determining the mutual relationships of the primary colors in order to ensure exact color reproduction. Thus, the final target color is formed of the color mixed from primary colors and the color of the background added to it. Here, according to the invention, the spectral transparency of the diffractive component itself and, if required, its transparent substrate should also be considered, which affect how said background "is visible" through the component in question and its substrate while mixing with the color produced by the components.

In applications in which the diffractive components are implemented on an entirely or partly transparent substrate, for example on a plastic film, the diffractive structures can be implemented on both surfaces of the film-like substrate in question. Thus, a color effect implemented to a certain viewing direction is formed with the combined effect of these grating structures implemented on different surfaces.

When the application so allows, the detectability and contrast of the color effect produced according to the invention are at their best when using a dark substrate or a dark background behind a transparent substrate.

Diffractive Color System

The method and diffractive components according to the invention enable, in practice, the implementation of an entirely new diffractive color system. In order for, for example, graphic designers to utilize colors produced according to the invention in practice, a comprehensive color system is required as a common "language" to be used through the design and production processes of the products-as the basis of communication.

The graphic designer of a final product/packing containing diffractive color effects must have specification means in use, by means of which to utilize diffractively mixed colors in his/her design work and to communicate further in a reliable and unambiguous manner about the plan with the customer, and especially with the parties implementing the product and the diffractive components contained in it.

A clearly and unambiguously specified color system enables, for example, that the party producing the diffractive components or the means required for manufacturing them (for example the party manufacturing the master elements of printing blocks by using electron beam writing, or the manufacturer of embossing/printing blocks) has a way to standardize and/or automatize their production processes and ensure the quality of the product manufactured by them.

The customer and the parties of the design and manufacturing processes must have the opportunity to check and monitor the quality of manufacturing the final product and the related printing work, in other words they must be able to ensure that the diffractively implemented colors are reproduced in the products exactly as they were planned and ordered.

In the following, one way to specify a diffractive color system is presented as an example, which specification can be used throughout the entire planning and implementation process of a product for the exact specification of the target color in different steps of the entire process.

The diffractive color system according to the invention can be created, for example, in the following manner: Let us assume that there is a group of four primary color candidates in use, i.e. for example red (R), green (G), cyan (C) and blue (B). The mixed colors are always formed by means of the three primary colors and the additively mixed colors are specified directly as percentage portions of these primary colors in such a manner that the color space is covered as well as possible, i.e. a color spectrum as wide as possible is achieved. In addition, the color brightness i.e. luminance is varied in a manner that best becomes apparent from the horizontal lines of the appended table 1.

Thus, an individual mixed color receives the form kP1mP2nP3, in which P1, P2 and P3 are the primary colors from the group (R, G, B, C) and k, m and n are the percentages corresponding to each three primary colors. When the luminance is at the maximum k+m+n=100. The parameters k, m and n can be specified in such a manner that they are varied with a step of, for example, 5 or 10%. The smaller the step of variation selected for the above-mentioned parameters is, the larger the number of mixed colors that can be specified is. The color system can also be determined in such a manner that steps of the parameters k, m and n are not equidistant, in which case the color space can be covered in such a manner that more colors are focused to a certain part of the color space, or alternatively so that the entire color space is desired to be covered as evenly as possible.

The appended table 1 presents, in principle, the color system according to the invention, in which the mixed colors are formed in such a manner that the parameters k, m and n change at steps of 10%. If one of the parameters k, m or n receives the value zero, the corresponding primary color has been left unmarked in the table.

TABLE 1

Example of a diffractive color system.

| | | | | |
|---|---|---|---|---|
| 100R | 90R | ... | 20R | 10R |
| 100G | 90G | ... | 20G | 10G |
| 100C | 90C | ... | 20C | 10C |
| 90R10G | 81R9G | ... | 18R2G | 9R1G |
| 80R20G | 72R18G | ... | 16R4G | 8R2G |
| 70R30G | 63R27G | ... | 14R6G | 7R3G |
| ... | ... | ... | ... | ... |
| ... | ... | ... | ... | ... |
| 80R10G10B | 72R9G9B | ... | 16R2G2B | 8R1G1B |
| ... | ... | ... | ... | ... |

It is to be noted that table 1 does not present more than a few colors of the color system in question, but it is obvious to a man skilled in the art when examining the table 1 how the rest of the colors are formed. When moving vertically in the table, the chromaticity of the mixed color changes, and correspondingly, horizontally the luminance of the color in question. When moving from left to right on an individual row, the portion of individual primary colors scales every 10% when the luminance decreases from left to right.

Figure 11:
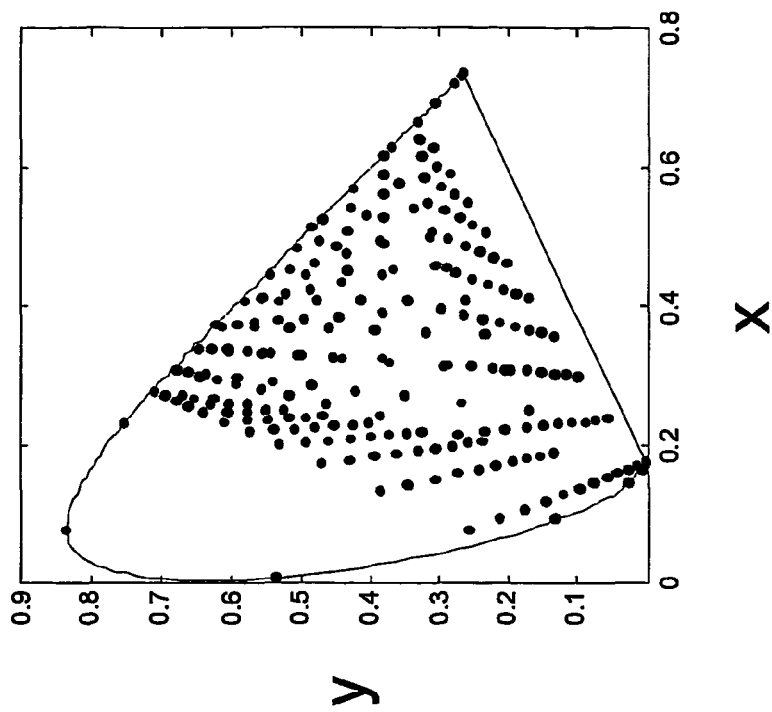
FIG. 11 shows the colors of a color system according to the invention placed in CIE 1931 xy-coordinates.

By means of four primary color candidates, of which at least three primary colors are selected into use for producing a mixed color, 2640 different mixed colors can be created, when 10% steps are used for parameters k, m and n. FIG. 11 shows these colors placed on the CIE 1931 xy coordinates.

If the step of the parameters k, m and n is selected to be, for example, 5%, the total number of mixed colors would be 18480. In principle, all these color combinations are not necessary to be included in the color system, but generally speaking, when using appropriately limited combinations, for example RGB and CGB combinations, the number of individual colors decreases but color space is still covered entirely.

An individual data form is preferably created for the diffractive color system, for example by numbering individually all the individual colors of the color system, i.e. the color palette. Thus, it is possible to form a one-dimensional color chart. A four-dimensional color chart is created in such a manner that a four-dimensional bitmap is formed, in which a value telling the relative portion of each primary color is associated with each point of the map. When complete, the color chart contains all the required information for an individual target color for producing diffractively the color in question by mixing primary colors. This information also includes detailed information on the characteristics of the elementary gratings producing primary colors.

For a graphic designer, it is possible to further calculate, from the colors of the color system, for example the so-called sRGB values, i.e. the RGB values of a standard display. As was already noted in the beginning, all the colors of a diffractive color system do not fit within the sRGB color spectrum (see for example FIG. 3), but they can, however, be reproduced as similar as possible by using a display device.

A significant tool from the point of view of graphic designers is the various color samples, which illustratively present the colors according to the color system. These color samples can, when required, be implemented, for example, on various materials and against various background colors.

Therefore, the designer can, when designing an effect, select the desired color from a hand-held color sample, further select the same color on the computer from the color palette of the graphics software being used, which software further automatically stores the color into such data form that can easily be modified to data controlling the lithographic printing block manufacturing, for example to the so-called e-beam data controlling electron beam writing.

The above-described diffractive color chart is just one embodiment of the inventive basic idea presented in this application. By means of the invention it is possible to form several different color charts, in which the weighting coefficients of the primary colors can be freely selected without steps. A common denominator for all these is, however, that the primary colors mixed together are selected application-specifically and/or target color-specifically from a wider group of primary color candidates. By application-specifically selecting from a primary color candidate group the primary colors most suitable for producing the color in question, it is possible to achieve a significantly larger color spectrum than in conventional color systems.

Thus, it is obvious that the invention is not limited solely to the embodiments presented in the previous examples, but the invention is to be interpreted only according to the limitations set by the appended claims.

The invention claimed is:

1. A method, comprising:
   selecting a target color; and
   forming two or more adjacent diffractive elementary gratings on a substrate according to controlled area ratio such that the elementary gratings are together arranged to produce the target color by additively mixing two or more primary colors, where the target color is detectable in a predetermined viewing direction in predetermined illumination, and wherein each elementary grating is arranged to diffractively produce one of said primary colors in the predetermined viewing direction in the predetermined illumination, and wherein the primary colors produced by the elementary gratings are selected from a group of primary color candidates corresponding to spectral peaks of illuminating light in the predetermined illumination.

2. The method according to claim 1, wherein the primary color candidates correspond to the strongest spectral bands or lines of light emitted by a fluorescent lamp.

3. The method according to claim 2, wherein the primary color candidates correspond substantially to the wavelengths of 437 nm, 490 nm, 545 nm and 615 nm.

4. The method according to claim 1, wherein the primary color candidates correspond to spectral bands or lines distinguishable in the illumination implemented by means of semiconductor emitters.

5. The method according to claim 1, further comprising:
   forming a basic area unit comprising the elementary gratings.

6. The method according to claim 5, further comprising:
   forming the basic area unit such that the target color is produced in the predetermined illumination by additively mixing the two or more diffractively produced primary colors with a color of the substrate.

7. The method according to claim 5, wherein said basic area unit is formed of the elementary gratings as an array-like pixelated structure, in which an individual elementary grating represents an individual pixel.

8. The method according to claim 7, wherein the basic area unit is substantially rectangular.

9. The method according to claim 5, wherein said basic area unit is formed of the elementary gratings as a banded pixelated structure.

10. The method according to claim 1, wherein a color chart contains information for producing the target color.

11. The method according to claim 5, wherein the substrate is transparent, a color of a background is visible through the transparent substrate, and the basic area unit is formed such that the target color is produced in the predetermined illumination by additively mixing the two or more diffractively produced primary colors with a color of the background visible through the transparent substrate.

12. The method according to claim 1, wherein the profile of an elementary grating is selected from a group consisting of a binary profile, a sinusoidal profile, and a triangle profile.

13. The method according to claim 1, wherein said elementary gratings are formed on the substrate by embossing.

14. The method according to claim 12, wherein the embossing is performed as a roll-to-roll process.

15. The method according to claim 12, comprising providing control data for manufacturing a printing block by lithography such that a basic area unit, when embossed on the substrate by using the printing block reproduces the selected target color.

* * * * *